Figure 1:
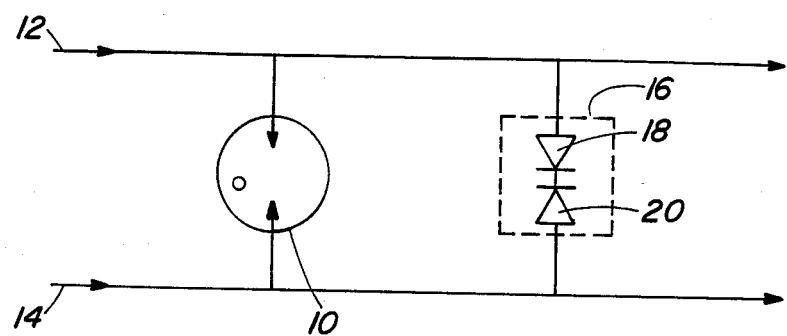

United States Patent [19]

Anderson et al.

[11] Patent Number: 4,544,983
[45] Date of Patent: Oct. 1, 1985

[54] OVERVOLTAGE PROTECTION DEVICE

[75] Inventors: James E. Anderson; Michael J. Coleman, both of Ontario; Frederick C. Livermore, Stittsville, all of Canada

[73] Assignee: Northern Telecom Limited, Montreal, Canada

[21] Appl. No.: 489,336

[22] Filed: Apr. 28, 1983

[51] Int. Cl.[4] .............................................. H02H 9/06
[52] U.S. Cl. ..................... 361/119; 361/56; 361/111; 361/124
[58] Field of Search ................ 361/56, 119, 111, 118, 361/55, 57, 124, 91

[56] References Cited

U.S. PATENT DOCUMENTS

| | | | |
|---|---|---|---|
| 2,793,331 | 5/1957 | Lamb | 361/56 |
| 3,558,830 | 1/1971 | Bender | 361/56 X |
| 3,934,175 | 1/1976 | Clark | 361/56 |
| 3,946,278 | 3/1976 | Hufnagel | 361/56 |
| 4,023,071 | 5/1977 | Fussell | 361/56 |
| 4,327,393 | 4/1982 | Hines et al. | 361/124 X |
| 4,389,695 | 6/1983 | Carpenter, Jr. | 361/56 X |

FOREIGN PATENT DOCUMENTS 214188  8/1974  France .

*Primary Examiner*—Patrick R. Salce
*Attorney, Agent, or Firm*—Thomas Adams

[57] ABSTRACT

An overvoltage protection device, for protecting communications equipment against hazardous voltages cue to lightning or power surges, comprises a primary protector, for example a gas tube device, and a back-up protector connected in parallel. The back-up protector includes a semiconductor pn junction, and is preferably a pair of diodes back-to-back. The back-up protector has a breakdown voltage slightly higher than that of the primary protector and is arranged to fail short-circuit once it has operated so as to provide an indication that the primary protector failed to operate.

5 Claims, 5 Drawing Figures

OVERVOLTAGE PROTECTION DEVICE

The invention relates to overvoltage protection devices, particularly for use in protecting communications equipment, for example telephone equipment, against hazardous voltages due to lightning or induced power surges in interconnecting cables.

It is common practice to protect such equipment by a primary protector, for example a gas tube or carbon black device or varistor, which will operate repeatedly to shunt surge energy away from the equipment. However, over a period of time such devices may cease to operate correctly. In particular, a gas tube may leak and admit air to replace the gas. As a result, the breakdown voltage of the gap increases, usually to a level too high for the equipment to tolerate. Also, all such devices are subject to variation in their actual breakdown voltage above and below a nominal value. It is possible, therefore, for the device very occasionally not to break down despite the applied voltage exceeding the maximum withstand voltage of the equipment to be protected.

To overcome this problem it is common to provide a second protection device usually referred to as a "back-up" device, in parallel with the primary protector. The back-up protection device will have a breakdown voltage slightly higher than that of the primary device, so that it will only operate if the primary protector fails to operate due to the aforementioned increase in its breakdown voltage.

According to the present invention it is proposed to provide an overvoltage protection device comprising a primary protector having in normal operation a first breakdown voltage, and a second protector having in normal operation a breakdown voltage higher than the first breakdown voltage. The second protector comprises a semiconductor pn junction device and is connected directly in parallel with the primary protector, which may be a gas tube, carbon black, varistor or other known such device. The semiconductor device may comprise a pair of diodes in back-to-back relationship or a compound device.

Preferably the semiconductor device is arranged to have a normal current capacity significantly less than the current it will be forced to carry when its breakdown voltage is exceeded, thereby ensuring that the device will fail in a short circuit condition on its first operation. The reason for such failure being preferred is that the device serves only as a back-up to the normal gas tube or other primary protector and it is desirable for the malfunctioning of the primary protector to be readily detectable once it has occurred. Therefore, the short circuiting of the secondary protector will be easily detectable or can even be arranged to provide immediate signalling of the fault condition, for example, by causing a fuse to blow.

It will be appreciated that the current-carrying connections to the pn junctions device and within the package of the device must be capable of carrying the overload current without being disrupted. Therefore, the pn junction device must have a rather unusual construction in that the pn junction itself must be arranged to have a low current carrying capacity and the package a significantly higher current-carrying capacity to ensure a reasonable operating margin.

In preferred embodiments the junction is arranged to fuse between the input electrodes to provide substantially a short-circuit capable of carrying as much current as is required to fuse off the fuse-link connections to the device, typically 22 a.w.g. wires.

It has been proposed previously to use a gas filled spark gap in combination with a pn junction semiconductor device, see for example, U.S. Pat. No. 3,934,175 by Clark. However, Clark's device is distinguished from the present invention because his semiconductor diode serves only to dissipate a part of the surge already partially dissipated by the spark gap. The semiconductor device is not in this respect a back-up device, but rather a so-called secondary protector because it operates as well as the spark gap, rather than instead of it. Moreover, Clark's protector utilizes a delay line between the spark gap and the diode so that the rise time of the surge applied to the pn junction is slower than that applied to the spark gap to ensure that the spark gap will always operate first, followed some time later by the diode. Moreover, Clark's diode is not intended to be destroyed on its first operation by failing in the short-circuit condition.

Figure 2A:
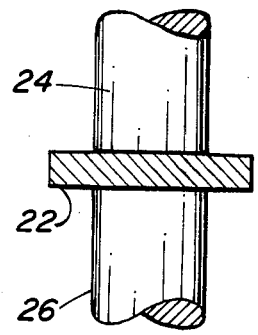
Figure 2B:
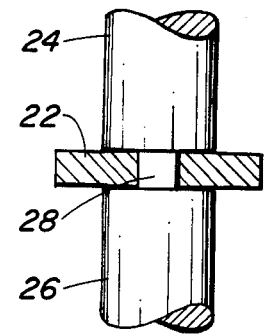
Figure 3A:
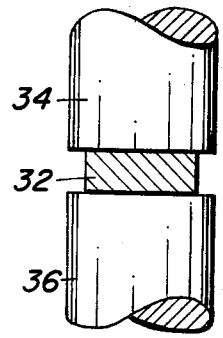
Figure 3B:
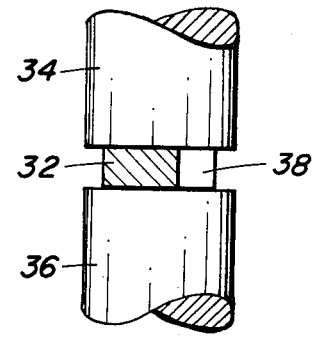

An embodiment of the invention will now be described, by way of example only, with reference to the accompanying drawings, in which:

FIG. 1 illustrates a gas tube primary protector with a semiconductor back-up;

FIGS. 2(a) and 2(b) illustrate schematically cross-sections through the semiconductor device before and after its breakdown; and FIGS. 3(a) and 3(b) are corresponding views of an alternative semiconductor device.

Referring to FIG. 1, a gas tube protector 10 of known construction is shown in connection across the ends 12 and 14 of a transmission line, for example a telephone line. A semiconductor pn junction device 16, comprising a pair of diodes 18 and 20 back-to-back, is connected in parallel with the gas tube protector 10, and with terminals 22, 24 for connection to the equipment to be protected.

Typically the diodes will have a reverse breakdown voltage of 800–1,000 volts if they are to operate with a gas-filled tube since the latter usually have breakdown voltages from 350 volts to 800 volts. The rating of the diodes may be as little as 0.1 Joules, although, as explained later, the package must have a relatively higher current-carrying capacity once it has short-circuited.

In normal operation a surge, due to lightning or induced power, appearing at the ends 12, 14 of the transmission line causes the gas tube to break down. The reverse breakdown voltage of the semiconductor device 16 is higher than the breakdown voltage of the gas tube so the semiconductor device 16 does not switch. However, if for any of the reasons mentioned previously the gas tube does not break down at the prescribed voltage, the surge will be applied to the semiconductor device directly. Assuming that the surge voltage exceeds the reverse voltage breakdown level of the device 16, it will break down and conduct, effectively short-circuiting the line. The current through the device 16 is then limited only by the telephone of the line. Typically currents can range from less than 1 amp to several hundred. The devices are required to carry at least 350 amps without fusing open circuit. Consequently the pn junction breaks down permanently as illustrated in FIGS. 2(b) and 3(b).

In FIG. 2(a) a back-up device 16 is shown to comprise a chip 22 of silicon having two back-to-back pn junctions formed therein. Input electrodes 24 and 26, respectively connect to opposite sides of the chip 22 and are of slightly lesser cross-sectional area than the semiconductor chip. FIG. 2(b) shows the device after operation. It was found that the silicon has fused at a central position 28 between the electrodes to connect them together.

In FIG. 3(a) an alternative construction is illustrated, similar to that of FIGS. 2(a) and 2(b) but having input electrodes 34 and 36, respectively, which are of greater cross-sectional area than the silicon chip 32. After operation it was found that the silicon had fused at an edge portion, as at 38. In both devices, after fusing the device was substantially short-circuit and was capable of withstanding sufficient short-circuit current to fuse-off 22 a.w.g. connections.

It will be appreciated that the short-circuited device 16 must be able to handle sufficient current for fuses to operate elsewhere in the circuit so as to locate the faulty protector. Ideally the short-circuited junction of device 16 has the same current-carrying capacity as its input leads, which is greater than that of the line conductors, usually 22 a.w.g.

An advantage of using a semiconductor device as a back-up is that its operating voltage can be carefully controlled and accurate predetermined voltages achieved more readily than other types of back-up gaps, for example, air gaps.

What is claimed is:

1. An overvoltage protection device, for telephone lines and other communications channels, comprising a primary protector and a secondary protector connected in parallel, the primary protector having in normal operation a first breakdown voltage, the secondary protector comprising a semiconductor pn junction having in normal operation a breakdown voltage greater than said first breakdown voltage and a current-carrying capacity significantly less than the current the pn junction would be required to carry once its aforesaid breakage voltage was exceeded, whereby the pn junction will fail short-circuit following its operation.

2. An overvoltage protection device as defined in claim 9, wherein said primary protector comprises a gas tube.

3. An overvoltage protection device as defined in claim 9, wherein said secondary protector comprises a pair of semiconductor junctions in back-to-back configuration.

4. An overvoltage protection device as defined in claim 4, wherein said secondary protector comprises a pair of diodes.

5. An overvoltage protection device as defined in claim 2, wherein said secondary protector has input terminals connected to the semiconductor material, which is arranged so as to be fused between said terminals by said current when the breakdown voltage is exceeded.

* * * * *

UNITED STATES PATENT AND TRADEMARK OFFICE
CERTIFICATE OF CORRECTION

PATENT NO. : 4,544,983
DATED : October 1, 1985
INVENTOR(S) : James E. Anderson

It is certified that error appears in the above-identified patent and that said Letters Patent is hereby corrected as shown below:

Column 4, line 11, "breakage" should read -- breakdown --.

Column 4, line 14, "9" should read -- 1 --.

Column 4, line 17, "9" should resd -- 1 --.

Column 4, line 21, "4" should read -- 3 --.

Column 4, line 24, "2" should read -- 1 --.

Signed and Sealed this

Twenty-ninth Day of April 1986

[SEAL]

Attest:

DONALD J. QUIGG

Attesting Officer  Commissioner of Patents and Trademarks